UNITED STATES PATENT OFFICE.

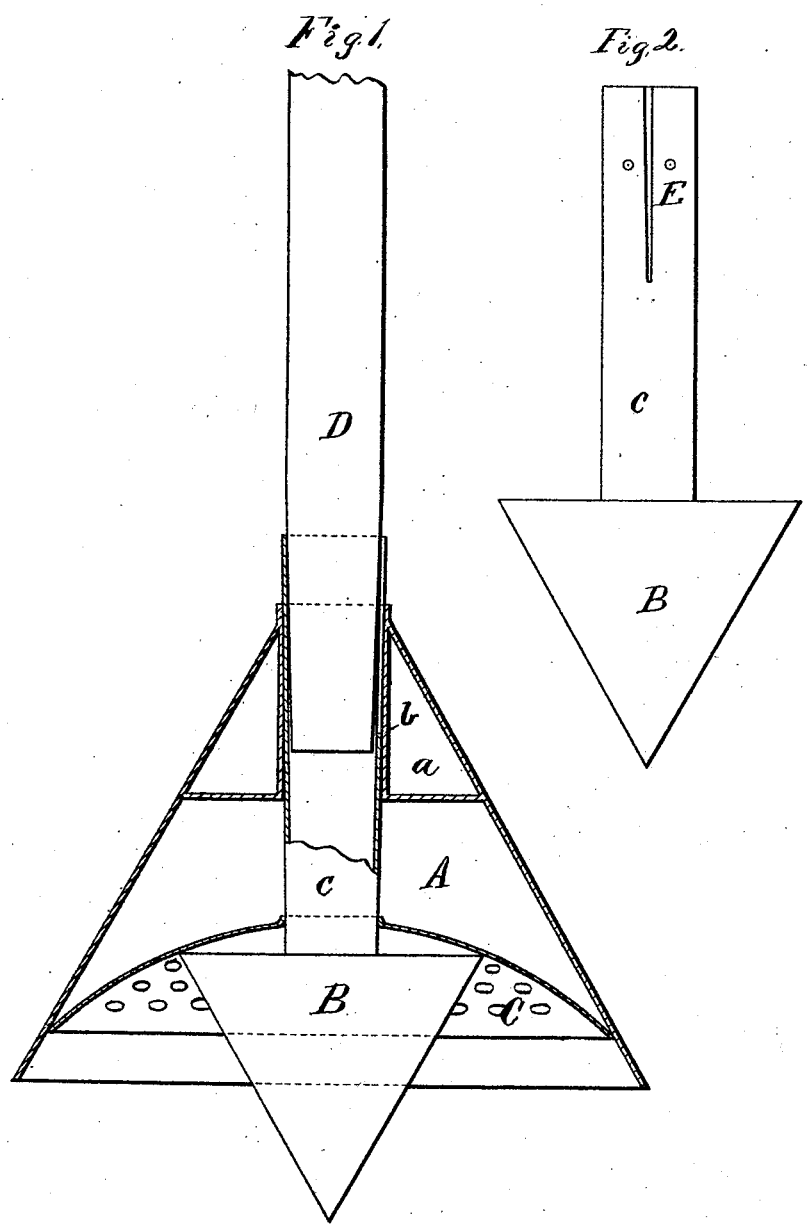

ALEXANDER E. QUEENSBERRY, OF AMELIA, VA., ASSIGNOR OF PART OF HIS RIGHT TO RICHARD TYLER POWELL AND MARK RICHARD LLOYD.

IMPROVEMENT IN CHURN-DASHERS.

Specification forming part of Letters Patent No. 184,424, dated November 14, 1876; application filed April 29, 1876.

*To all whom it may concern:*

Be it known that I, ALEXANDER E. QUEENSBERRY, of Amelia, in the county of Amelia and State of Virginia, have invented a new and valuable Improvement in Cream-Pounders; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical section of my cream-pounder, and Fig. 2 is a detail view of the same.

This invention has relation to means of facilitating the operation of making butter in an open or closed vessel; and the nature of my invention consists in the frustum of a cone, an inverted cone having a split tube to receive a handle, and a concavo-convex perforated diaphragm, combined in the manner which I will now describe.

In the annexed drawings, A designates the body of the improved dasher, which is the frustum of a cone, and which may be made of any suitable size. Near the apex of this conical frustum is a ring, $a$, soldered to a tube, $b$, which tube is soldered to the said conical frustum. B designates an inverted cone, to the base of which is permanently secured a tube, $c$, which is split, as shown at E, and which, when it is in place, passes up through the tube $b$, and extends through the apex of the conical frustum A. C designates a perforated diaphragm, which is of concavo-convex form, and which is at the base of the cone, and tightly pressed against the interior side of the conical frustum A. The cone B, the diaphragm C, and the tube $c$ are all held in their proper places by means of a handle, D, the entering end of which is tapered, and, when forced into the split end of the tube $c$, spreads this tube, causing it to hug tightly the upper end of the cone.

It will be seen from the above description that, by simply removing the handle D, the inverted cone and diaphragm can be readily removed from the conical frustum and cleansed.

The operation of my invention is as follows: When the dasher is quickly forced down into the milk the inverted cone B will force the milk outward against the interior surface of the conical frustum A and the bottom surface of the diaphragm C, and also through the perforations of this diaphragm, which will operate to rapidly break up the butter globules, and also to gather the same. When the dasher is suddenly raised the cone A will throw the milk from it toward the side of the tub. I thus produce violent agitation of the milk in the tub without expenditure of much force, and facilitate the operation of making butter.

What I claim as new, and desire to secure by Letters Patent, is—

1. A dasher composed of the conical frustum A, the inverted cone B, the perforated concavo-convex diaphragm C, and the tube $c$, substantially as described.

2. In combination with the cones A B and diaphragm C, the split tube $c$, all secured in place by the handle D, in the manner described.

In testimony that I claim the above I have hereunto subscribed my name in the presence of two witnesses.

ALEXANDER EDWARD QUEENSBERRY.

Witnesses:
MARK RICHARD LLOYD,
RICHARD TYLER POWELL.